M. JUNGLING.
RESILIENT WHEEL.
APPLICATION FILED FEB. 26, 1920.

1,344,513.

Patented June 22, 1920.
3 SHEETS—SHEET 1.

Witnesses

Inventor
Michael Jungling,
By
Attorney

M. JUNGLING.
RESILIENT WHEEL.
APPLICATION FILED FEB. 26, 1920.
1,344,513.
Patented June 22, 1920.
3 SHEETS—SHEET 2.
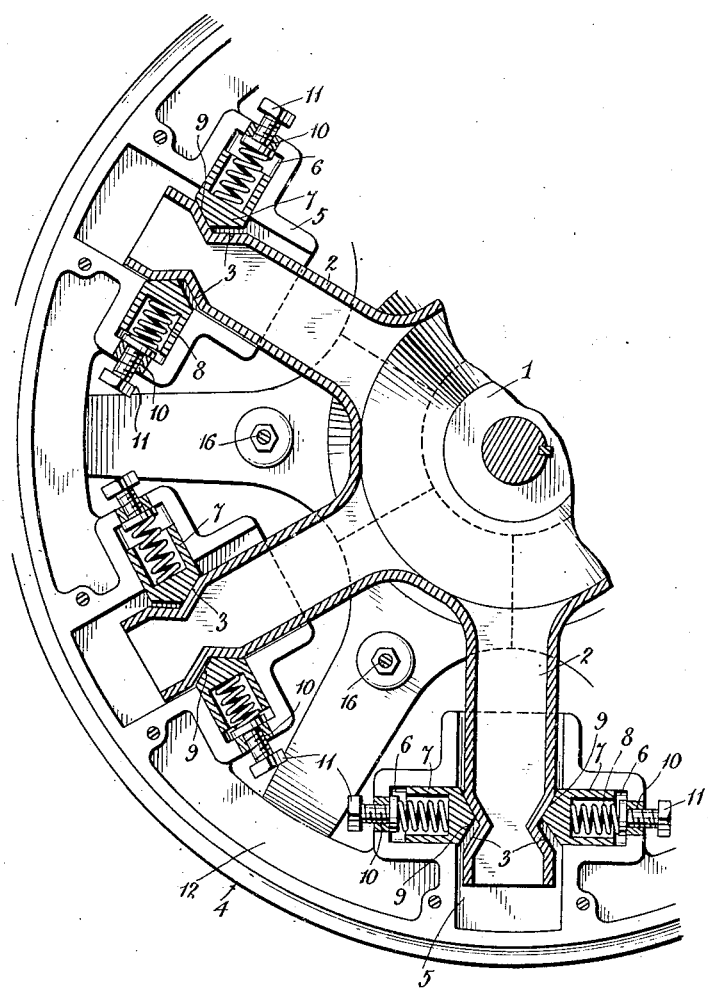
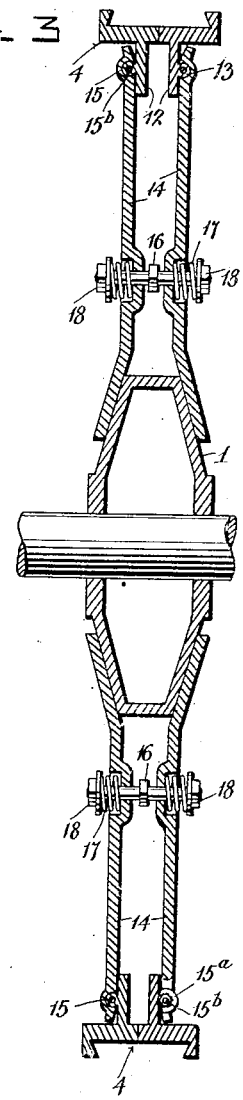
Witnesses
Inventor
Michael Jungling,
By
Attorney M. JUNGLING.
RESILIENT WHEEL.
APPLICATION FILED FEB. 26, 1920.
1,344,513.
Patented June 22, 1920.
3 SHEETS—SHEET 3.
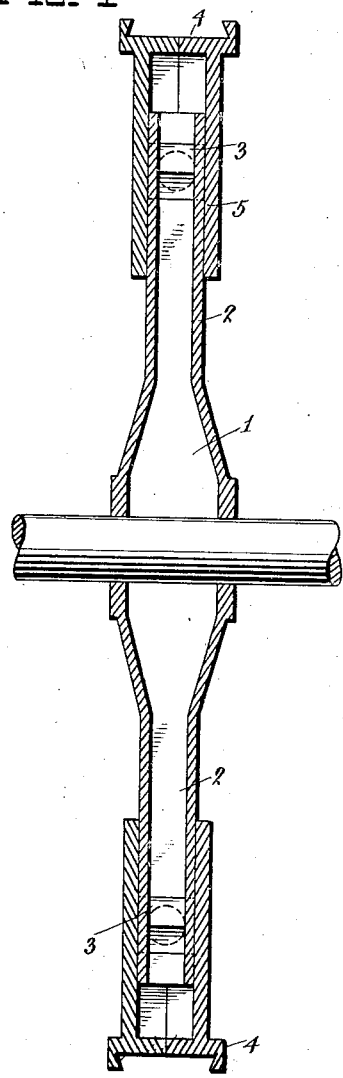
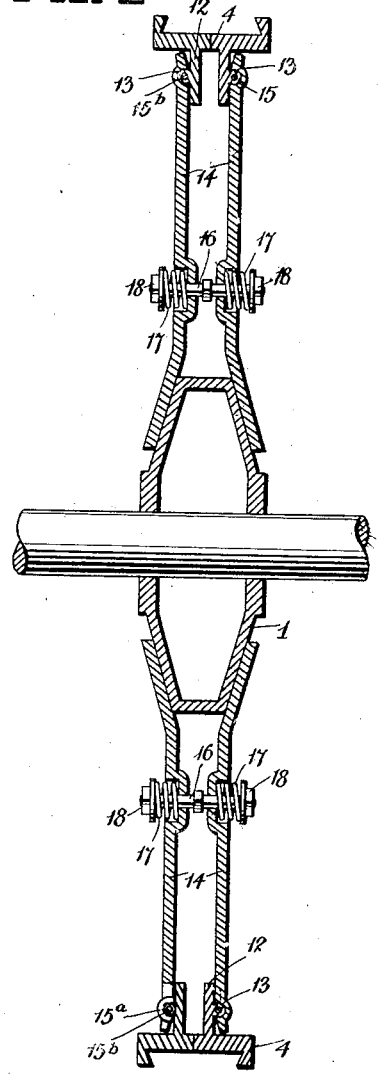
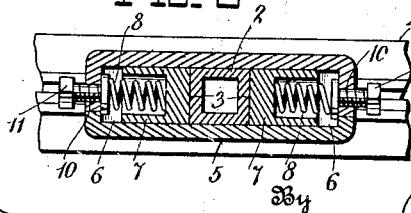
Inventor
Michael Jungling,
Witnesses
Attorney

UNITED STATES PATENT OFFICE.

MICHAEL JUNGLING, OF WASHINGTON, DISTRICT OF COLUMBIA.

RESILIENT WHEEL.

1,344,513.  Specification of Letters Patent.  Patented June 22, 1920.

Application filed February 26, 1920. Serial No. 361,582.

*To all whom it may concern:*

Be it known that I, MICHAEL JUNGLING, a citizen of the United States, residing at Washington, in the District of Columbia, have invented new and useful Improvements in Resilient Wheels, of which the following is a specification.

This invention relates to resilient wheels.

As is known in the art, one of the difficulties attending the use of resilient wheels is to overcome the lateral play present in most wheels when they are in use, which is liable to strain the parts of the wheels, and which may produce a binding or jamming effect upon the axle, and which may result in undue wear and tear on the tires.

The objects of this invention are to not only provide for a predetermined resiliency, but in addition thereto, prevent any undue lateral play on the part of the wheel portions, thereby preventing excess displacement of any part of the wheel from the median plane, to produce a wheel of greater strength and full resiliency whereby road shocks are evenly distributed and taken up by all parts of the wheel and consisting of relatively few parts, which is not liable to get out of order, which will function successfully under all traction conditions, in which the resiliency of the wheel may be regulated, according to the load to be carried, and which, while not affecting the steering of the vehicle, will resist the driving and braking torque to a necessary extent.

With these and other objects in view, my invention consists in certain features of structure, combination and relation which will be more fully set forth hereinafter.

I have illustrated one embodiment of my improvement in the accompanying drawings, wherein:

Fig. 2 is a fragmentary section of one of my improved wheels;

Fig. 3 is a detail of a portion of the hub and of the spring plate members;

Fig. 4 is a section through a portion of the hub and one of my improved spoke members;

Fig. 5 is a sectional view of a portion of the hub and a pair of spring plate members;

Fig. 6 is a horizontal section taken on line 6—6 of Fig. 1.

Referring to the drawings, wherein similar numerals denote like parts throughout the several views:

Figure 1:
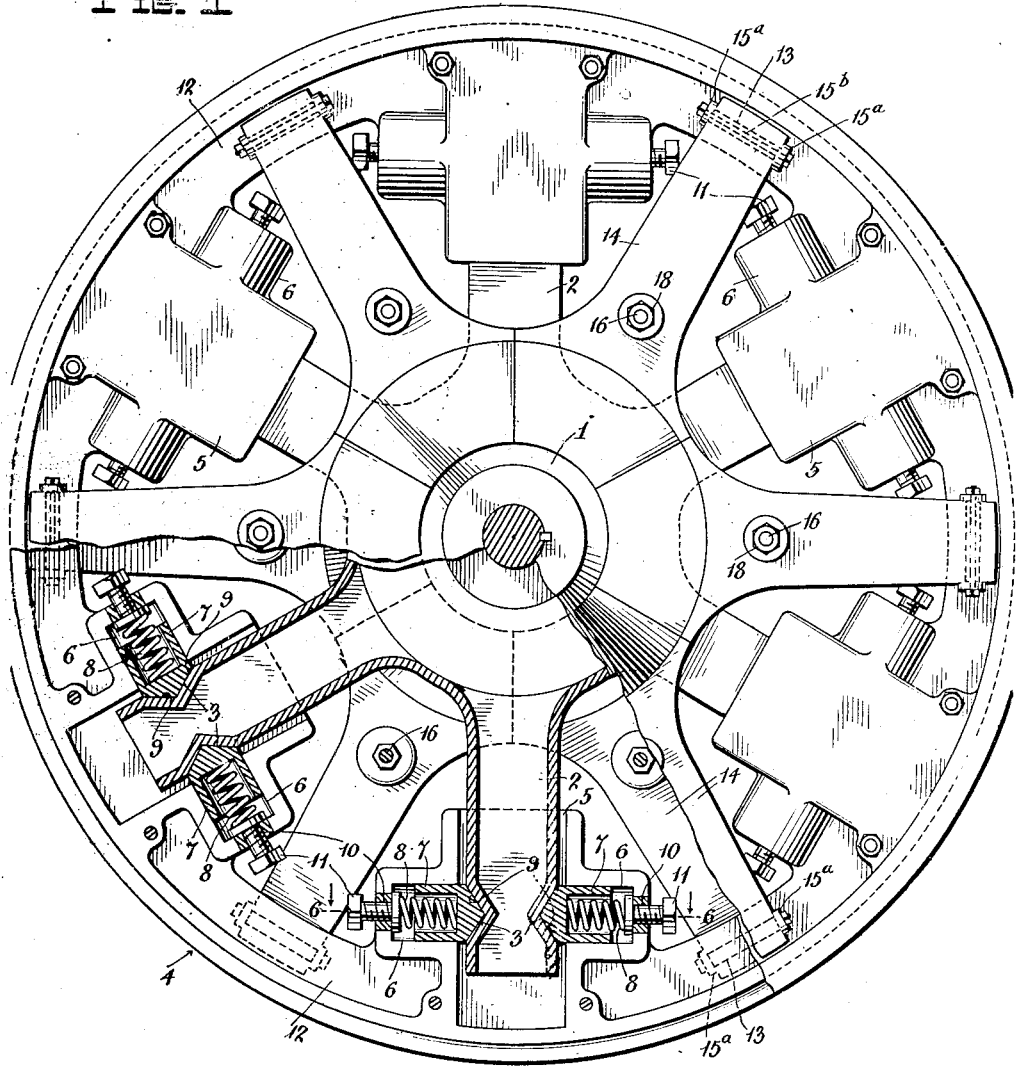
Figure 1 is a side elevation, partly broken away.

My improvement comprises a hub portion 1 which is so formed as to be of transversely tapering section and which carries a plurality of spokes 2. The spokes are formed, preferably, of metal and are provided adjacent their free ends with transverse cam notches 3.

Coöperating with the hub and spokes is a rim member 4 formed preferably as a two-part structure, which rim carries housings 5 provided with lateral chambers 6. Hollow pistons or plungers 7 which house coiled springs 8 are adapted to slide in these lateral chambers and the pistons or plungers have one end beveled, as at 9, so as to coöperate with notches 3 of the spoke members to resist vertical displacement of the rim relative to the spokes. The outer ends of the lateral chambers have screw threaded openings 10 into which the spring adjusting screws 11 are threaded.

The rim also carries standards 12, these standards bearing bosses 13 which are provided with central longitudinally extending apertures. Plates 14 associated in pairs, each plate being provided at one end with a recess 15 adapted to engage one of the bosses 13 and with ears $15^a$ at each end of the recess, a bolt $15^b$ projecting through each pair of ears and through the boss 13 whereby the plates are hinged upon the standards, extend inward from the rim, the inner end of each plate being formed so as to take over the beveled faces of the hub. These plates are further held together by means of bolt 16 which carries the heavy coiled springs 17 and spring pressure is applied to the plates and regulated by means of nuts 18. The major portion of the load is carried by the spring plate members acting on the hub portions.

The spring pressure on spokes 2 may be regulated through means of screws 11.

It will be seen that by this improved structure vertical or radial displacement of the rim relative to the hub is permitted and a certain amount of transverse movement of the rim relative to the axis of the hub, but at the same time any undue lateral movement of the rim relative to the hub is prevented and as soon as pressure on any of the spoke members or on the plate members is relieved, the rim will be returned to normal position by the action of the springs, and that by the provision of the pistons or plungers pressure on the rim at any point is evenly distributed throughout the spring devices.

Having now described my invention, what I claim as new is:

1. In a resilient wheel, a hub portion having a plurality of spokes projecting therefrom, each spoke being provided with a pair of oppositely disposed transverse notches adjacent the free end thereof, a rim, a plurality of spoke end housings mounted on said rim, bevel faced pistons mounted in each side of said housings and adapted to take into the notches of said spokes, a spring mounted in each of said pistons, a screw having a bearing in said spoke end housing and adapted to press upon said springs, and whereby the pressure on said pistons may be regulated.

2. In a resilient wheel, a hub portion, a plurality of spoke members projecting therefrom, said hub portion being beveled between said spoke members, a pair of plate members having a bearing at one end on the beveled side faces of said hub, a rim, standards secured to said rim, the outer ends of said plate members being pivoted on said standards, spring-pressed means extending through said plate members and adapted to press said plate members together and housings mounted on said rim and adapted to inclose the outer ends of said spoke members.

3. In a resilient wheel, a hub portion of transversely tapering section, a rim member, a plurality of plate members pivotally associated with said rim member, said plate members being arranged in pairs, the inner ends of each pair of plate members being adapted to bear on the side walls of said hub, bolts connecting said plate members, springs carried by said bolts and adapted to press said plate members together, a plurality of spokes projecting from said hub member, each of said spokes being provided adjacent its free end with a pair of cam notches, spoke end housings carried by said rim member, a pair of cam-faced pistons mounted in each of said housings, a spring in each of said pistons, and means for compressing said springs.

4. In a resilient wheel, a hub, a plurality of spokes projecting from said hub, each of said spokes being formed with a pair of notches adjacent its outer end, a rim, a housing secured to said rim and adapted to inclose the outer ends of the spokes, said housing being formed with lateral chambers, plungers in said lateral chambers, and adjustable spring means adapted to force said plungers against said notched spokes.

5. In a resilient wheel, a hub portion of transversely tapering section, a plurality of spokes projecting from said hub portion, a rim, a pair of standards secured to said rim, a pair of plates having a bearing at one end upon said standards, means to press the plates of each pair toward one another, the inwardly projecting end of each plate being formed to project outward and adapted to take over the tapered sides of the hub portion, and housings mounted on the rim and adapted to surround the spoke ends.

In testimony whereof I have hereunto set my hand in presence of two subscribing witnesses.

MICHAEL JUNGLING.

Witnesses:
LORENZ A. WENDEL,
CLIFFORD M. EDWARDS.